(12) United States Patent
Shen et al.

(10) Patent No.: US 7,433,946 B2
(45) Date of Patent: Oct. 7, 2008

(54) MECHANISM FOR TRANSMITTING ELEMENTARY STREAMS IN A BROADCAST ENVIRONMENT

(75) Inventors: Guobin Shen, Beijing (CN); Shipeng Li, Redmond, WA (US); Hua Cai, Beijing (CN); Regis J. Crinon, Camas, WA (US); Ze-wen Zhang, Beijing (CN); Guangping Gao, Beijing (CN); Hong-Hui Sun, Beijing (CN); Baogang Yao, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 818 days.

(21) Appl. No.: 10/917,243

(22) Filed: Aug. 12, 2004

(65) Prior Publication Data

US 2006/0036759 A1 Feb. 16, 2006

(51) Int. Cl.
*G06F 15/173* (2006.01)
*G06F 15/16* (2006.01)
*G06F 5/00* (2006.01)

(52) U.S. Cl. .................. 709/223; 709/231; 709/232; 710/52

(58) Field of Classification Search .................. 709/223, 709/231, 232; 710/52, 58
See application file for complete search history.

(56) References Cited

U.S. PATENT DOCUMENTS

2005/0022253 A1* 1/2005 Chen et al. .................. 725/135

\* cited by examiner

*Primary Examiner*—Jason Cardone
*Assistant Examiner*—Tanim Hossain
(74) *Attorney, Agent, or Firm*—Lee & Hayess, PLLC

(57) ABSTRACT

The techniques and mechanisms described herein are directed at transmitting elementary streams in a broadcast environment. The mechanisms provide a buffer controller and packet scheduler that allow a media format to be transmitted through the broadcasting environment in a manner resulting in a low channel switch delay. A buffer-fullness indicator allows the operation with various types of decoders. A lower bound and an upper bound are calculated for each frame within the elementary stream. The lower bound corresponds to an earliest time for sending the frame without causing an overflow condition within a decoder buffer. The upper bound corresponds to a latest time for sending the frame without causing an underflow condition within the decoder buffer. A send time is then scheduled based on the lower bound and the upper bound that determines when a packet associated with the frame is transmitted over a channel in a broadcast environment.

30 Claims, 9 Drawing Sheets

MECHANISM FOR TRANSMITTING ELEMENTARY STREAMS IN A BROADCAST ENVIRONMENT

TECHNICAL FIELD

This document generally relates to elementary streams, and more particularly, to methods for efficiently transmitting elementary streams in a broadcast environment.

BACKGROUND

In the past, video applications were transmitted at a constant bit rate. Accordingly, most video sequences are coded using a constant bit rate (CBR) mode. This is especially true when using the conventional MPEG (Moving Picture Experts Group) transport infrastructure. However, today, in order to improve the coding efficiency for elementary streams, many video sequences are coded using a variable bit rate (VBR) mode. Consequently, many video applications are not transmitted at a constant bit rate. For example, some video applications are streamed through the Internet, which results in varying transmission rates due to various network paths (e.g., modem, ISDN, DSL, cable) and network conditions (e.g., number of users, congestion). Even in the broadcast environment (e.g., cable, satellite, terrestrial) where the channel rate is fixed, elementary streams may be transported at varying bit rates to better utilize the channel by statistical multiplexing of multiple elementary streams. In addition to the various transmission rates, the video applications are transmitted to a variety of devices, each having their own specifications for buffer size, delay constraints, and the like. For example, video applications may be transmitted to personal digital assistants (PDAs), personal computers (PCs), set-top-boxes, DVD-like players, and the like.

In order to provide the correct motion rendition and certain level of quality fidelity, bit-rate variations are smoothed using buffering mechanisms that ensure no overflow or underflow of the decoder buffers. One way in which decoder buffers can be ensured not to overflow or underflow is by adjusting the rate of data delivery of the channel. However, as mentioned above, either the channel rate is fixed (e.g. broadcast environment) or the channel rate is not controllable (e.g. over the Internet). Thus, the rate of data delivery is not easily adjustable for handling the data rate of elementary streams that are time-varying. Therefore, decoders in broadcast receivers slave their timing to the data received from the channel. The channel transports packets that have a packet header followed by a number of contiguous bytes of an elementary stream. The headers specify intended times at which the video/audio information in the elementary stream is to be decoded and to be presented by the decoder. These specified times then serve as a reference for clock correction and buffer management. While the decoders do not have to follow the specified times exactly, they must compensate for any deviations.

A common coding syntax has been recommended that synchronizes the decoding and presentation of the video and audio information to ensure that decoder buffers do not overflow or underflow. This common coding syntax is specified by MPEG (Moving Picture Experts Group) working group of the ISO. MPEG specifies performance parameters for the video applications. Video applications that adhere to these standards can then operate over the MPEG transport infrastructure.

Because the MPEG standard does not specify the architecture or implementation of encoders or decoders, a considerable degree of freedom exists in the design and implementation of encoders and decoders. Therefore, continuous improvements are made to and encouraged in the implementations of encoders and decoders.

SUMMARY

The techniques and mechanisms described herein are directed at handling elementary streams in a broadcast environment. The mechanisms provide a buffer controller and packet scheduler that allow a media format to be transmitted through the broadcasting environment in a manner such that a user experiences a low channel switch delay when changing to a new channel. In addition, the mechanisms provide a buffer-fullness indicator that allows various types of decoders to operate according to initial buffer fullness in addition to traditional decoding timestamp (DTS). A lower bound and an upper bound are calculated for each frame within the elementary stream. The lower bound corresponds to an earliest time for sending the frame without causing an overflow condition within a decoder buffer. The upper bound corresponds to a latest time for sending the frame without causing an underflow condition within the decoder buffer. A send time is then scheduled based on the lower bound and the upper bound that determines when a packet associated with the frame is transmitted over a channel in a broadcast environment.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

Briefly, the present method for transmitting elementary streams provides a buffering technique that is operational in a broadcast environment. In overview, the present method provides a buffer controller and a scheduler that ensures the elementary stream will be displayed smoothly and ensures that users will experience an acceptable delay when switching channels. These and other advantages will become clear after reading the following detailed description.

Figure 1:
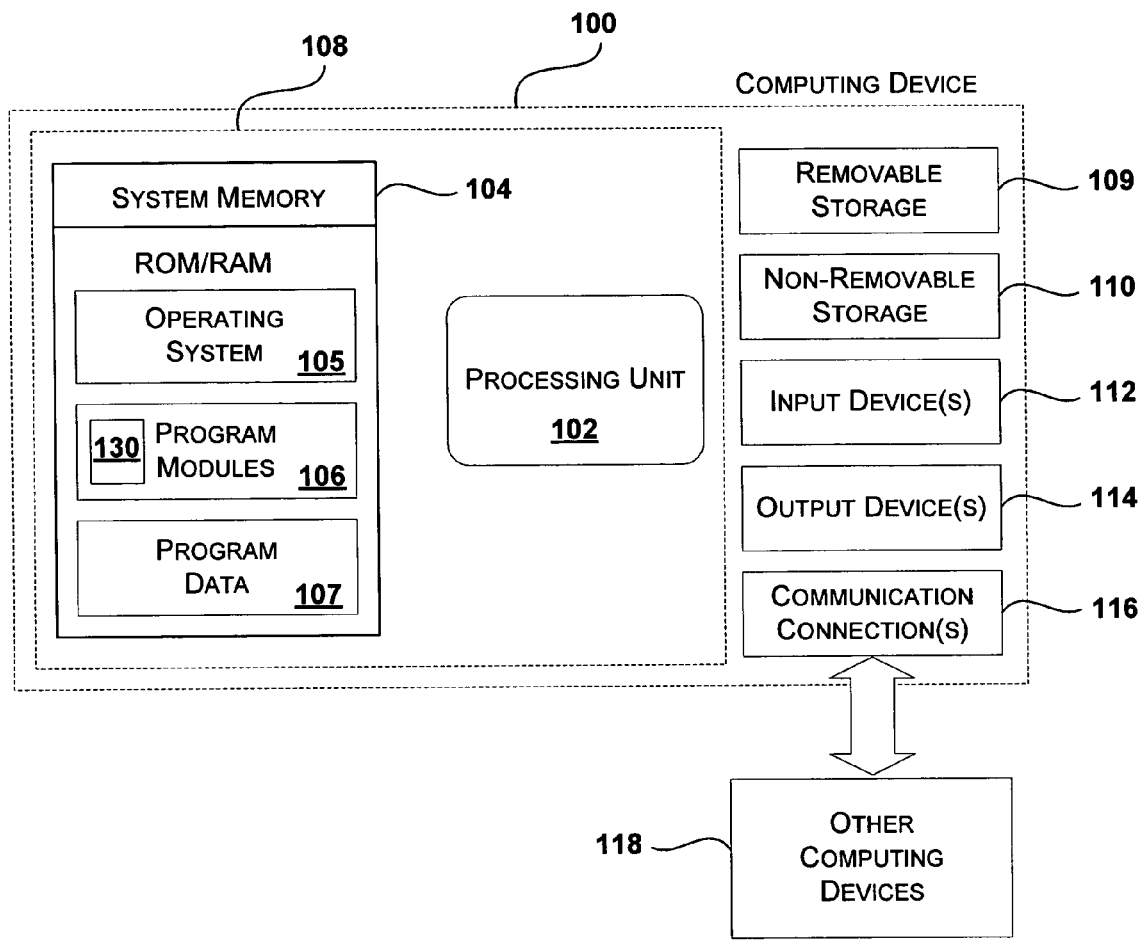
FIG. 1 is an illustrative computing device that may be used to implement the techniques and mechanisms described herein.

FIG. 1 illustrates one exemplary system for implementing the present method for handling elementary streams. The system includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. The program modules 106 may include one or more components 130 for implementing the present method for handling elementary streams. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Thus, computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well know in the art and need not be discussed at length here.

Computing device 100 may also contain communication connections 116 that allow the device to communicate with other computing devices 118, such as over a network. Communication connection(s) 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media can be any available media that can be accessed by a computer. By way of example, and not limitation, computer readable media may comprise "computer storage media" and "communications media."

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

Figure 2:
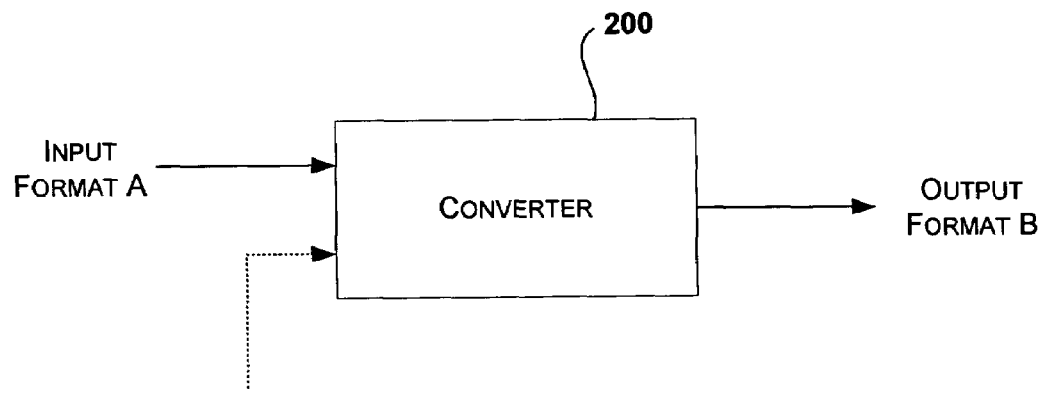
FIG. 2 is an illustrative converter and de-converter that operate in accordance with the present techniques and mechanisms.
Figure 2:
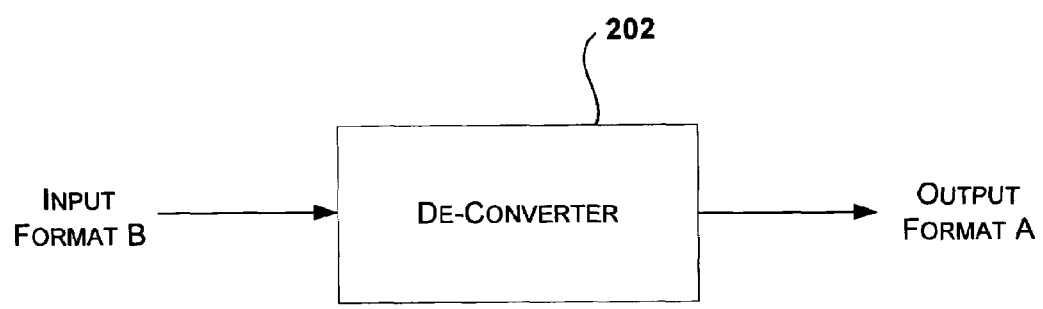

FIG. 2 illustrates a converter 200 and a de-converter 202 that implement portions of the present techniques and mechanisms. Converter 200 and de-converter 202 may each be implemented as one or more software modules, by hardware, or any combination thereof. Converter 200 accepts an input (e.g., Input Format A) and outputs an output (e.g., Output Format B). In accordance with the present method, Output B is in a format that may be transported over a broadcasting infrastructure. De-converter 202 accepts input in the format output by converter 200 (Format B) and outputs a file having the Format A.

The following describes some exemplary embodiments for converter 200 and de-converter 202. In a first embodiment of converter 200, the present mechanisms may be implemented in an offline conversion tool. The offline conversion tool may convert a file (Input Format A) having a specific media format (e.g., an Advanced Systems Format (ASF)) to an output having a transport stream format (e.g., MPEG-2 TS). The offline conversion tool may automatically handle different profiles of the specific media format (e.g., VC-9 Simple Profile (SP), VC-9 Main Profile (MP), Advanced Profile (AP), and the like). The offline conversion tool may perform two passes on Input Format A. In a first pass, the offline conversion tool may analyze an elementary stream within Input A and determine the necessary information for optimizing a buffer controller operation. In a second pass, the offline conversion tool may create the transport packets that include the elementary stream and the optimized buffer scheduling information. Briefly, described in detail in conjunction with FIGS. 4 and 5, the buffer controller operation ensures that that elementary stream within Input A is converted into a transport stream format that will not cause a buffer overflow or underflow condition in a decoder responsible for decoding the transport stream format. The present buffering and scheduling mechanisms are described below.

In another embodiment, the present buffering and scheduling mechanism may be implemented in an online conversion tool that is integrated with an encoder. The online conversion tool accepts the output of the encoder and creates a transport stream format. The online conversion tool may perform one-pass on the output of the encoder. In this configuration, an external caller will provide the optimized buffering scheduling information associated with the input as long as the external caller has full knowledge about the buffer control mechanism of the encoding module or the encoding module has provided its internal buffer control information to the external caller. Thus, the online conversion tool obtains the output samples from the encoder module and calls the buffering methods and scheduling methods described below to output an MPEG based bit stream. Again, the transport stream format may be MPEG-2 TS. In a further refinement, the encoder may be the WINDOWS® MEDIA encoder that supports audio elementary streams in the WMAv1 or WMAv2 format, video elementary streams in the VC-9 Advanced Profile video format (codec FOURCC: WMVA). In contrast with a current implementation of the WINDOWS® MEDIA encoder that outputs an ASF file, the present encoder embodiment is configured to directly output the MPEG based bit stream (e.g., MPEG-2 TS).

In an embodiment of de-converter 202, the present mechanisms may be implemented in an offline reconstruction tool. The offline reconstruction tool is configured to reconstruct the file having the specific media format from the transport stream format created by the offline conversion tool, the online conversion tool, or other tool. This offline reconstruction tool may aid in the verification of the online and offline tools and may also provide the ability to view the MPEG based bit stream in the original media format.

Figure 3:
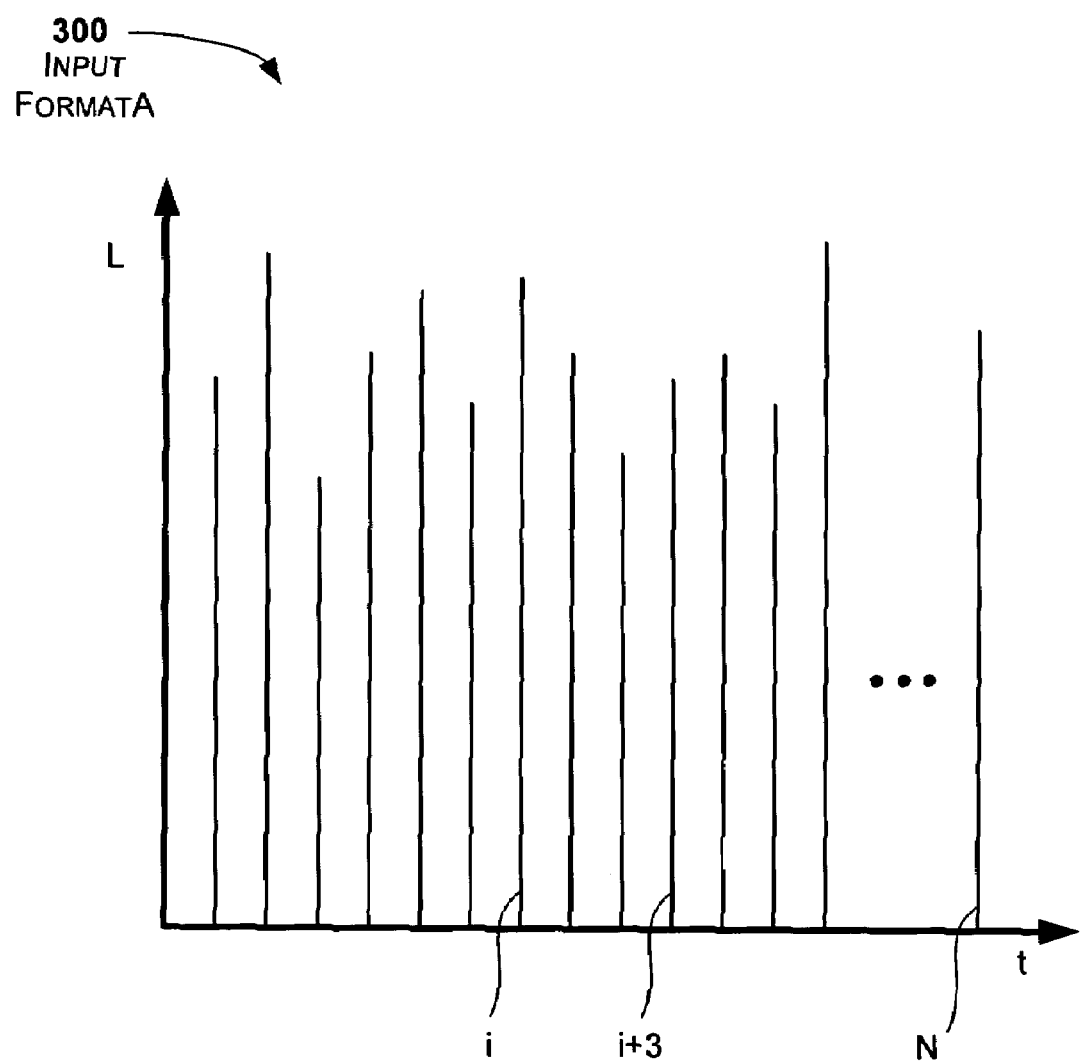
FIG. 3 is a graphical depiction of an input shown in FIG. 2.

FIG. 3 is a graphical depiction of an input with Format A, as shown in FIG. 2. Each vertical line represents a frame. There is a total number N frames. The y-axis represents the length L (i.e., number of bits) in each frame. The x-axis represents the time. As shown, there are individual frames (e.g., frame i, frame i+3) that have a different length L. Even though the frames have a different number of bits, each frame needs to be viewed for the same time duration. If one frame is viewed for a shorter time frame than another, incorrect motion rendition occurs. Each of these frames is input into a decoder buffer that can accept a maximum number of bits B. It is important that the decoder buffer does not underflow, which would cause an error or incorrect motion rendition. It is also important that the decoder buffer does not overflow, which would result in a loss of data.

As one skilled in the art appreciates, video coding standards do not mandate specific encoder or decoder buffering mechanisms, but rather they require encoders to control bit-rate fluctuations in a manner such that a hypothetical reference decoder (HRD) of a given buffer size is able to decode the video stream without experiencing a buffer overflow or a buffer underflow condition. The hypothetical decoder is based on an idealized decoder model that manufacturer can use as a reference in their implementations. The main goal of the hypothetical decoder is to impose basic buffering constraints on the bit-rate variations of compliant bit streams. The HRD is characterized by three parameters: a peak sending rate (R); a buffer size (B); and an initial decoder buffer fullness (F). Thus, given a desired peak sending rate (R), the HRD can determine the minimum buffer size $B_{min}$ that can be used to decode the bitstream without suffering from buffer overflow or underflow. Conversely, given a buffer size B, the HRD can determine the minimum peak sending rate $R_{min}$. For additional information on video coding standards, one is invited to view the MPEG standard detailed in the ISO/IEC 13818-1, second edition, 2000-12-01.

As will be described, the present technique provides a bound-based Hypothical Reference Decoder (HRD), a bound-based elementary stream (ES) scheduler, and an initial-buffer-fullness updater. As will be shown, the present technique determines the HRD parameters in a different manner than previous HRDs. In overview, the present technique calculates the sending time lower bound and the upper bound for each frame. This is achieved by scanning the bit stream twice. During one scan, the bit stream is scanned from the first frame to the last frame in order to determine the lower bound. During another scan, the bit stream is scanned from the last frame to the first frame to determine the upper bound. The bound-based scheduler is then configured to flexibly choose a proper sending time for each frame. This allows the present mechanism to operate on varying channel bandwidths and/or with varying decoder buffer sizes, even though in practice the channel bandwidth and decoder buffer size are fixed. In addition, the present mechanism may be augmented with the initial-buffer-fullness updater that allows the present mechanism to support different decoding techniques that are implemented in decoders. The operation of the present mechanism will now be described in further detail.

Figure 4:
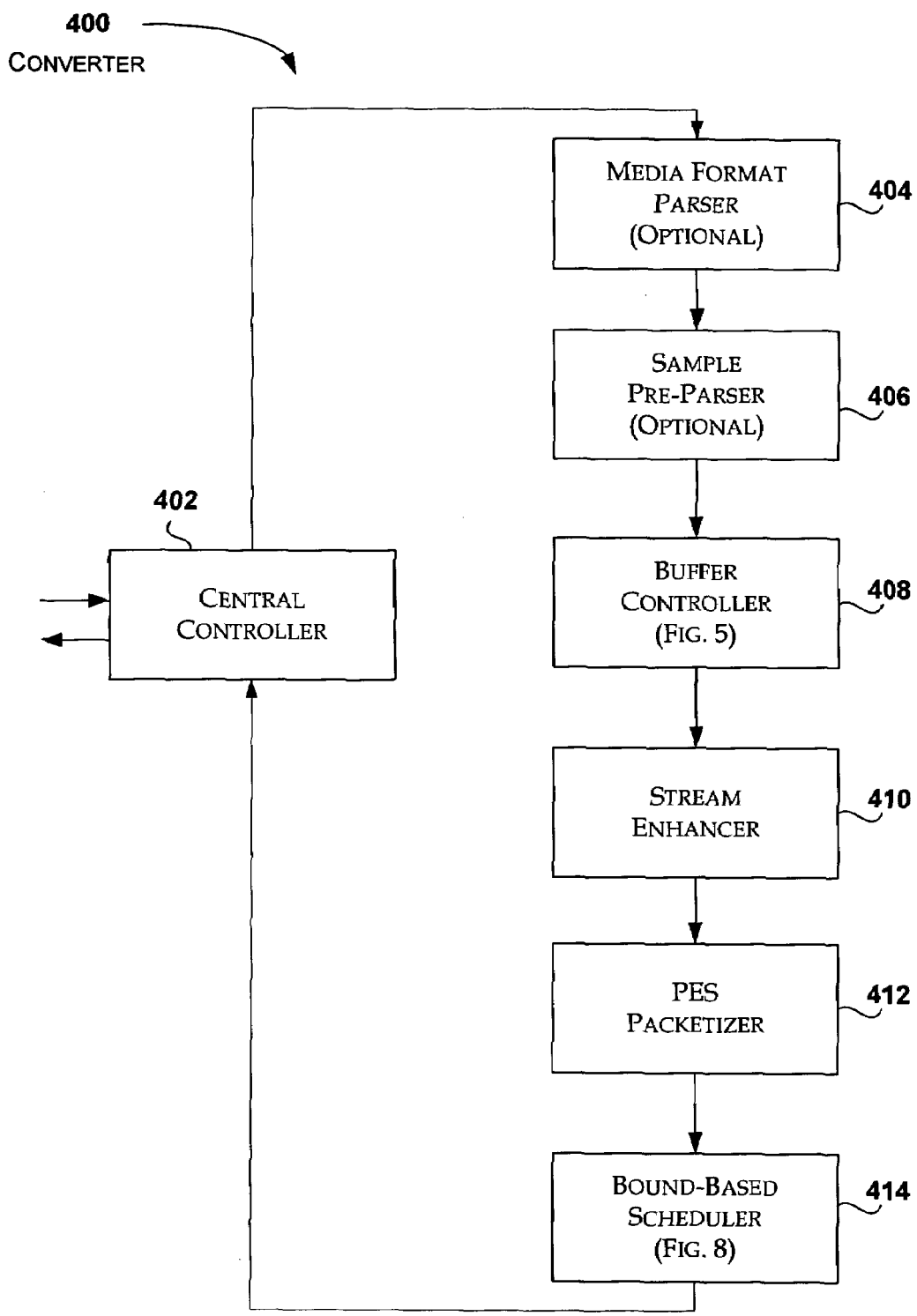
FIG. 4 is a block diagram illustrating an overview of an exemplary operation of the converter shown in FIG. 2.

FIG. 4 is a block diagram illustrating an overview of an exemplary operation of the converter shown in FIG. 2. Process 400 is intrinsically uni-directional. Each block 404-414 operates as a filter and is connected in a pipeline manner. Each block accepts input from the block in front and passes its own output to a subsequent block. Blocks 404 and 406 are optional. Block 402 represents a Central Controller (hereinafter, referred to as Central Controller 402). Central Controller is configured to initialize and to control the filters 404-414. Central Controller 402 accepts input and provides the input to a first filter (e.g., Sample Pre-Parser 406). In addition, Central Controller 402 accepts output from the last filter (e.g., Bound-based Scheduler 414). Before describing these components in further detail, common terminology used in the area of video encoding is described based on the definitions provided in the above referenced MPEG standard.

Encoding is a process that reads a stream of input pictures or audio samples and produces a coded bit stream. An elementary stream is a generic term for one of the coded video, coded audio, or other coded bit streams. A PES packet is a data structure used to carry elementary stream data. The PES packet includes a PES packet header followed by a number of contiguous bytes from an elementary stream. PES is an abbreviation for a Packetized Elementary Stream. A PES Stream includes PES packets, all of whose payloads consists of data from a single elementary stream, and all of which have the same stream id. A channel is a digital medium that stores or transports a stream. A data element is an item of data as represented before encoding and after decoding. An access unit is a coded representation of a presentation unit. In the case of audio, an access unit is the coded representation of an audio frame. In the case of video, an access unit includes all the coded data for a picture, and any stuffing that follows it, up to but not including the start of the next access unit.

Decoding time-stamp (DTS) is a field that may be present in a PES packet header that indicates the time that an access unit is decoded in the system target decoder. Program clock reference (PCR) is a time stamp in the Transport Stream from which decoder timing is derived. Program Specific Information (PSI) consists of normative data which is necessary for the demultiplexing of Transport Streams and the successful regeneration of programs. System Clock Reference (SCR) is a time stamp in the Program Stream from which decoder timing is derived.

Program Stream results from combining one or more streams of PES packets, which have a common time base, into a single stream. The Program Stream is designed for use in relatively error-free environments and is suitable for application which may involve software processing of system information such as interactive multi-media applications. A Transport Stream results from combining one or more programs with one or more independent time bases into a single stream. The PES packets make up elementary streams that form a program that shares a common timebase. The Transport Stream is designed for use in an environment where errors are likely, such as storage or transmission in lossy or noisy media. Transport Stream packets are 188 bytes in length. The following discussion focuses on Transport Streams.

Referring back to FIG. 4, each of the components will now be described in further detail. Central Controller 402 accepts input from an external caller and forwards output from the filters 404-414. During initialization, the Central Controller 402 builds the filter pipeline, converts external parameters to internal data structures. The internal data structures are then used to initialize each filter 404-414. Central Controller 402 may also create a mapping mechanism for translating stream numbers to process ids (pid). This allows the other filters to use the pid directly. Input samples are accepted by the Central Controller 402 and converted into sample packets which are pushed to a first filter. Upon receiving a request to end, the Central Controller 402 will create a command packet that includes a flush indicator. It then pushes the command packet to the filter pipeline, which makes each filter flush their internal buffer.

Media Format Parser 404 is an optional component and used in the offline conversion tool embodiment. The Media Format Parser 404 is configured to extract the elementary stream information and the stream samples from a file. The Media Format Parser 404 is responsible for obtaining the information that is to be transmitted from a server side to a client side. This information includes sequence-level information, such as a codec type for each stream, codec specific data for each stream, and the like. In one embodiment, the Media Format Parser 404 relies on a WINDOWS® MEDIA component, WMFSDK, to extract the elementary stream information and the stream samples from an ASF file. For this embodiment, when the video is WMv9 SP/MP video, a width, a height, a FOURCC, and codec specific data is transmitted to the receiver. However, when the video is WMV9 Advance Profile, only a FOURCC and coded specific data is transmitted to the receiver. When the data is audio, the Media Format Parser 404 obtains information, such as number of channels, samples per second, average bytes per second, audio packet size, bit per sample, codec tag number, and codec specific data, and the like. Some of this information may then be transmitted to the receiver.

Sample Pre-Parser 406 is an optional pre-process module that is used in the offline converter embodiment for certain types of input. Sample Pre-Parser 406 is configured to process input that already includes sequence and entry point headers. The Sample Pre-Parser 406 extracts samples from the input by removing any sequence headers and entry point headers in the input. This ensures that the filter that follows will handle uniform samples even if the input types are different. When the header is removed, Sample Pre-Parser 406 compares the removed header (i.e., current header) with a previous header. If the removed header is different, the removed header is set as the default header. The default header is then used by subsequent filters when processing the associated sample. Sample Pre-Parser 406 may also provide a bypass mode. If the bypass mode is turned on, the input is directly passed to the Buffer Controller 408 without any of the processing described above.

Buffer Controller 408 is a sample scheduling module. In overview, the Buffer Controller 408 determines a sample's sending time and a sample's sending duration. Buffer Controller 408 also synchronizes the audio and video samples according to their sending time before pushing them to the Stream Enhancer 410. The Buffer Controller 408 is responsible for ensuring that the sending time and sending duration do not cause the decoder buffer to either overflow or to underflow. In addition, the Buffer Controller 408 is responsible for limiting the channel switch delay to an acceptable time. Detail operation of the Buffer Controller 408 is described below in conjunction with FIG. 5.

Stream Enhancer 410 accepts samples passed by the Buffer Controller 408. Stream Enhancer 410 is configured to add sequence-level information to samples and to create a final sample. The final samples include a correct sequence header or entry point header and a correct number of padding bytes. Stream Enhancer 410 determines whether a sequence header or entry point header was passed with the sample. If the new header was passed in, Stream Enhancer 410 stores the header and uses it as a default header thereafter. If the sample is a video sample, the Stream Enhancer 410 first performs a startcode emulation prevention process that prevents any possible emulation of all the startcodes. Each startcode includes of a startcode prefix and a startcode identifier. The startcode suffices to prevent emulation of startcode prefix in order to avoid startcode emulation. By using the startcode, the application can easily find the various synchronization points. For example, when tuning to a new channel, the decoder seeks to the Sequence Startcode and starts buffering the data thereafter. When an error occurs in some frame, the decoder can then easily jump to the next frame by seeking a next Frame Startcode. A set of startcodes are defined from the sequence level all the way down until the slice level. For additional information on Startcode, one is invited to read Annex E of VC-9 Spec.

Stream Enhancer 410 determines whether a video sample already has a frame header in the sample data. If a sample does not have an associated frame header, Stream Enhancer 410 adds a frame header to the sample. The Stream Enhancer 410 also checks whether the sample is at a switchable point or not. For the following discussion, switchable points refer to key frames (I-frames) that occur at a regular interval (typically 0.5 seconds). For each sample that is switchable, the Stream Enhancer 410 puts the sequence header before the switchable sample for VC-9 SP/MP video or the sequence header and entry point header for VC-9 Advanced Profile video. The output of the Stream Enhancer is received by the PES Packetizer 412.

The PES Packetizer 412 is configured to convert the elementary stream samples into PES packets. PES Packetizer 412 performs this responsibility by adding PES headers before the samples. In one embodiment, each PES packet is associated with one stream sample and a stream sample is contained within one PES packet. In another embodiment, a PES packet may be associated with multiple access units (i.e., multiple stream samples). Each PES packet contains a presentation time-stamp (PTS). For a video stream, the PES length field in the PES header is set to zero. For an audio stream, the PES length field in the PES header is set to the length of the sample. The output of the PES Packetizer is received by the Bound-based Scheduler 414.

The Bound-based Scheduler 414 is configured to convert PES packets to packets in the Output B format. In so doing, Bound-based scheduler 414 generates a program association table (PAT) and a program map table (PMT) from the program information and the stream information provided in the received PES packets. The Bound-based Scheduler 414 outputs the Output B format packets based on the sending time and sending duration that were calculated by the Buffer Controller 408. In addition, Bound-based Scheduler 414 regularly inserts Program Specific Information (PSI), such as PAT and PMT, and PCR packets into the TS output stream. The operation of the Bound-based Scheduler 414 is described in more detail below in conjunction with FIG. 8. The output of the Bound-based Scheduler 414 is received by Central Controller 402, which has the responsibility of sending the generated TS output stream through the broadcasting infrastructure.

Figure 5:
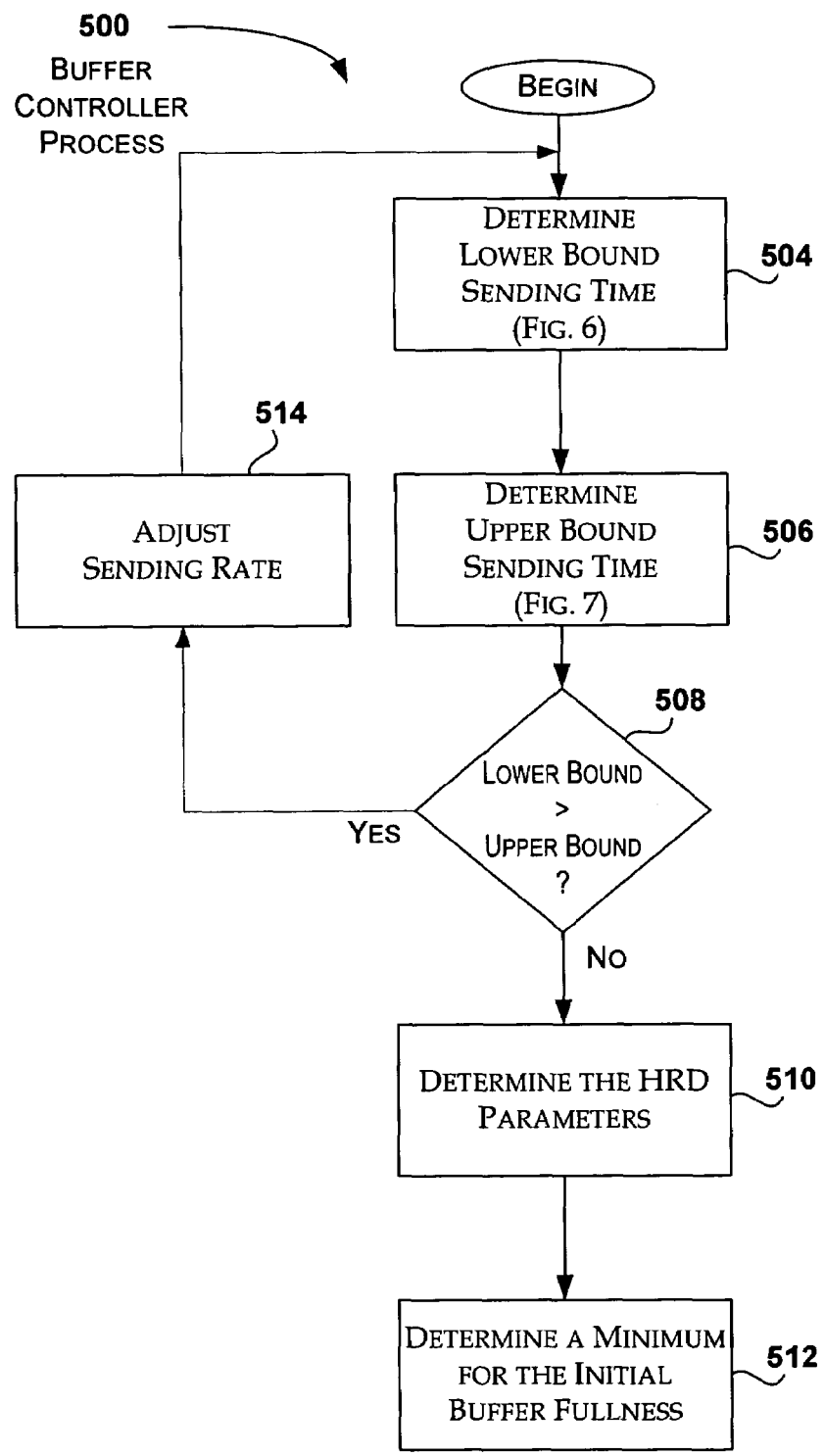
FIG. 5 is a flow diagram illustrating an exemplary buffer controller operation suitable for use in the block diagram illustrated in FIG. 4.

FIG. 5 is a flow diagram illustrating an exemplary buffer control process suitable for use within the Buffer Controller 408 illustrated in FIG. 4. Process 500 is performed for each frame. In accordance with the present buffer control process, the latest sending time and the earliest sending time is determined for each frame. By determining these time bounds, the present mechanism can minimize the requirement on channel bandwidth and/or the decoder buffer size. In addition, the present buffering mechanism takes into account the channel switch delay when determining the time bounds. The results of process 500 provide optimized buffer scheduling information, which when applied during transmission, will not result in a buffer overflow or a buffer underflow condition in the decoder buffer. Prior buffering mechanisms did not calculate the global optimal time bounds for sending every frame within the elementary stream. Rather, prior buffering mechanisms simulated a virtual decoder to repeat the decoding process that is performed in the decoder side when calculating HRDs. In addition, the prior buffering mechanisms did not consider the channel switch delay when determining their respective HRDs.

Process 500 begins at block 504, where a lower bound sending time is determined for the frame. The lower bound reflects the earliest sending time that a frame may be sent without suffering a buffer overflow condition. Briefly, described in detail in conjunction with FIG. 6, the present buffer control process 500 determines the lower bound sending time based on three conditions. Once the lower bound sending time is determined, processing continues at block 506.

At block 506, the upper bound sending time is determined for the frame. The upper bound reflects the latest sending time that a frame can be sent without suffering from a buffer underflow. Briefly, described in detail in conjunction with FIG. 7, the present buffer control process 500 determines the upper bound sending time based on two conditions. Once the upper bound sending time is determined, processing continues at decision block 508.

At decision block 508, a determination is made whether the lower bound sending time is greater than the upper bound sending time for the frame. If it is determined that the lower bound sending time is greater than the upper bound sending time for the frame, processing continues at block 514.

At block 514, the sending rate is increased. The sending rate is increased because having the lower bound sending time greater than the upper bound sending time indicates that the bitstream can not be transmitted at the current sending rate and buffer size without suffering from underflow or overflow. In one embodiment, a bisection method is performed in order to find the minimum sending rate. For example, to find $R_{min}$, the bisection search can be performed according to the following steps: (1) initially, let $R_{start}$ be zero and $R_{end}$ be a very large number; (2) let $R = (R_{start} + R_{end})/2$; (3) calculate the bound based on R; if the bound is valid, then $R_{end} = R$, otherwise, $R_{start} = R$; (4) go back to step (2) until $R_{end} - R_{start}$ less than a predefined value; (5) finally, $R_{end}$ is the minimum peak sending rate $R_{min}$. Once the minimum sending rate is determined, processing loops back to block 504 and continues as described above.

At decision block 508, if it is determined that the calculated lower bound ending time is not greater than the calculated upper bound sending time, processing continues at block 510.

At block 510, the HRD parameters are determined. Specifically, for a given buffer size, the minimum peak sending rate ($R_{min}$) is the smallest sending rate having a valid bound. For a given peak sending rate, the minimum buffer size ($B_{min}$) is the smallest buffer with a valid bound. By utilizing fast searching techniques, such as bisection method described above, the speed of the search process to find the minimum peak sending rate or minimum buffer size may be increased. Processing continues at block 512.

At block 512, a corresponding minimum initial-buffer-fullness F is determined based on the calculated minimum peak sending rate and minimum buffer size. This corresponding minimum initial-buffer-fullness ($F_0$) equals the buffer status $B(DTS_1)$ when sending frames at their upper bound sending time ($T_i^U$), where $DTS_1$ is the decoding timestamp of the first frame. The following equation determines the minimum initial-buffer-fullness:

$$F_0 = \sum_{j=1}^{k} \min [L_j, (DTS_1 - T_j^U) \times R], \quad \text{Eq. 1}$$

where k satisfies $T_k^U \leq DTS_1 < T_{k+1}^U$. Thus, as shown, the minimum initial-buffer-fullness is based on the summation over a number of frames of the minimum number of bits determined between the length of the frame ($L_j$) or the number of bits that can be decoded during the decoding time of the first frame ($DTS_1$) less the upper bound sending time of the jth frame ($T_j^U$) based on the rate (R). The decoding time (DTS) is intrinsic to the original audio/video source which can be extracted from the compressed video file (in offline mode) or from the encoder (in online mode). The determination of the upper bound sending time is described below in conjunction with FIG. 7.

Therefore, the result of process 500 includes optimized time bounds, HRD parameters, and a buffer fullness indication. These optimized time bounds provide an excellent basis for scheduling the sending of each frame, as will be described below in conjunction with FIG. 8 that illustrates an exemplary process the Bound-based Scheduler shown in FIG. 4.

Figure 6:
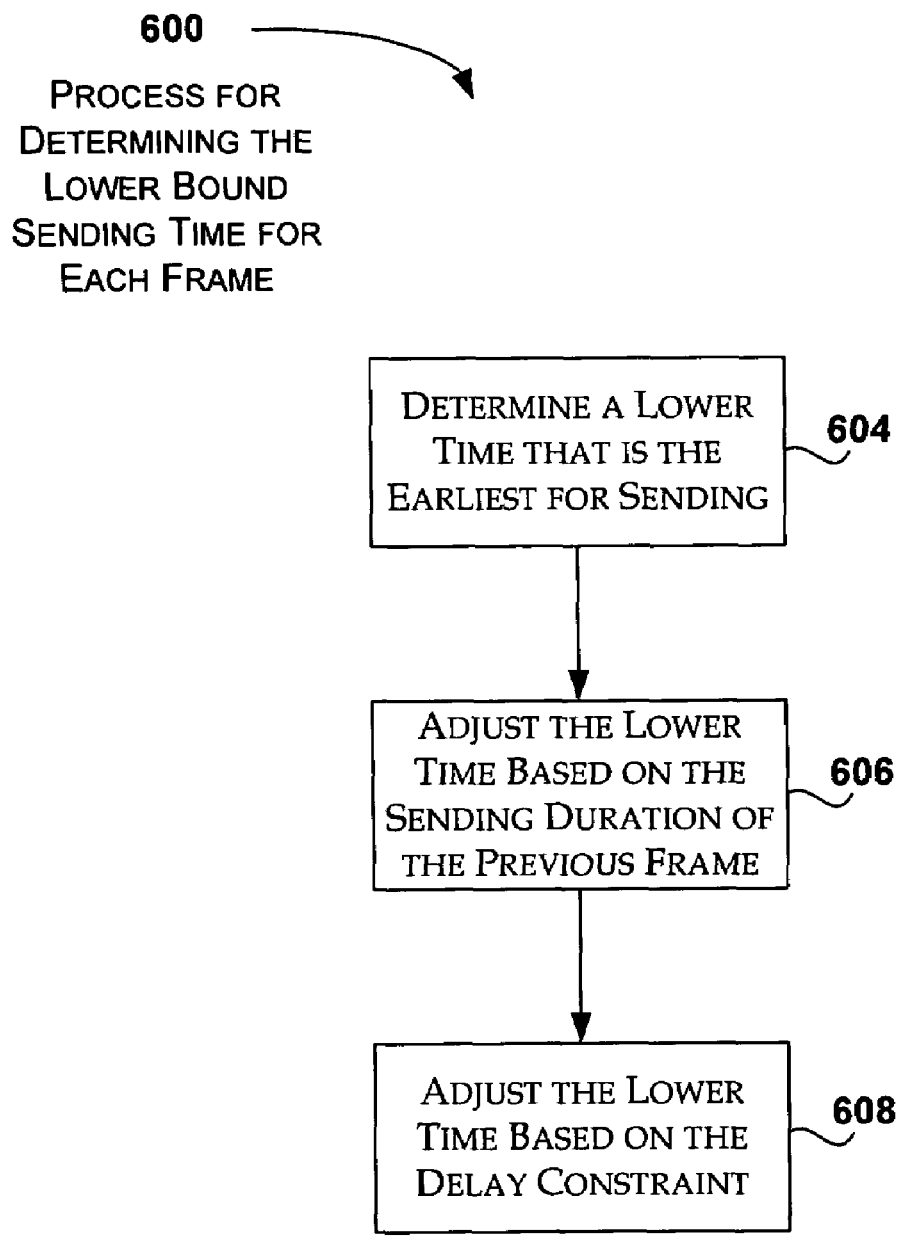
FIG. 6 is a flow diagram illustrating an exemplary process for determining the lower bound sending time for each frame that is suitable for use within the flow diagram illustrated in FIG. 5.

FIG. 6 illustrates an exemplary process 600 for determining the lower bound sending time that is performed for each frame. Process 600 determines the lower bound sending time based on three conditions, each condition being associated with one of the blocks 604-608. At block 604, the earliest sending time is determined that will keep the number of bits in the decoder buffer from overflowing. The following equation determines this earliest lower bound sending time ($\hat{T}_i^L$) for the $i^{th}$ frame:

$$\sum_{k=j}^{i-1} L_k + \min \left[ (DTS_j - \hat{T}_i^L), L_i/R \right] \times R \leq B \quad \text{Eq. 2}$$

for any $DTS_j \geq \hat{T}_i^L$.

Thus, as shown in equation 2, the earliest lower bound sending time is calculated in two parts. In a first part, the number of bits L for each of a certain number of frames prior to frame i (e.g., frame j to frame i−1) are summed. This determines the number of bits that will be in the decoder buffer when frame i is transmitted. In a second part, the minimum number of additional bits from frame i is calculated that will keep the total number of bits less than the buffer size (B). The number of additional bits from frame i is determined by taking the minimum number of bits calculated between two factors. The first factor $((DTS_j - \hat{T}_i^L)*R)$ is the number of bits that can be sent during the decoding time of frame j and the lower bound sending time of frame i. The second factor represents the total number of bits in frame i (i.e., $L_i/R*R$), where R is the sending rate. Thus, the minimum of these two factors are added to the first part to obtain the earliest lower bound sending time for the frame.

At block 606, a time adjustment is performed based on an interval condition that is checked. The interval condition ensures that the interval between any adjacent lower bounds is separated by at least the sending duration of the previous frame. The following equation ensures this condition:

$$T_i^L \geq T_{i-1}^L + L_{i-1}/R. \quad \text{Eq. 3}$$

If this condition is not met, the current frame i can not be sent at the calculated lower bound. In this situation, the lower bound sending time is adjusted to equal the lower bound sending time of the previous frame i−1 plus the sending duration of the previous frame i−1.

At block 608, another time adjustment may be performed. This time adjustment is based on a delay constraint condition that is checked at each switchable point and/or entry point. The delay constraint ensures that a user experiences minimal delay when switching channels. Combining the delay constraint condition with block 606 yields the following equation:

$$T_i^L = \begin{cases} DTS_1 - T_{Delay} & \text{for } i = 1 \\ \max(\hat{T}_i^L, T_{i-1}^L + L_{i-1}/R, DTS_i - T_{Delay}) & \text{for } i > 1 \text{ \& entry point} \\ \max(\hat{T}_i^L, T_{i-1}^L + L_{i-1}/R). & \text{else} \end{cases}$$

Eq. 4

Thus, as shown in the above equation, the lower bound sending time of the ith frame ($T_i^L$) varies upon which frame is currently being processed. One will note that $T_i^L$ refers to the actual lower bound sending time of the ith frame and $\hat{T}_i^L$ refers to the earliest lower bound sending time satisfying the first condition as described in block 604. If the current frame is the first frame, the lower bound is the decoding time of the first frame ($DTS_1$) less the maximum channel switch delay ($T_{Delay}$). If the current frame is not the first frame and is an entry point frame, the lower bound is the maximum time among three time calculations. The first time calculation is the earliest lower bound sending time determined during blocks 604 and 606. The second time calculation is the lower bound sending time of the previous frame ($T_{i-1}^L$) plus the sending duration of the previous frame ($L_{i-1}/R$). The third time calculation is the decoding time of the ith frame ($DTS_i$) less the maximum channel switch delay ($T_{Delay}$). For any other frame, the lower bound is the maximum time of the first and second time calculations described above.

Thus, as shown above in the equations, the present technique takes into account the delay constraint at every switchable point and/or entry point. By doing so, the present technique allows the user to switch into the program at any time while still providing the program to the user within a sufficient time delay. Prior techniques did not take this channel delay into consideration when determining the HRD parameters.

Figure 7:
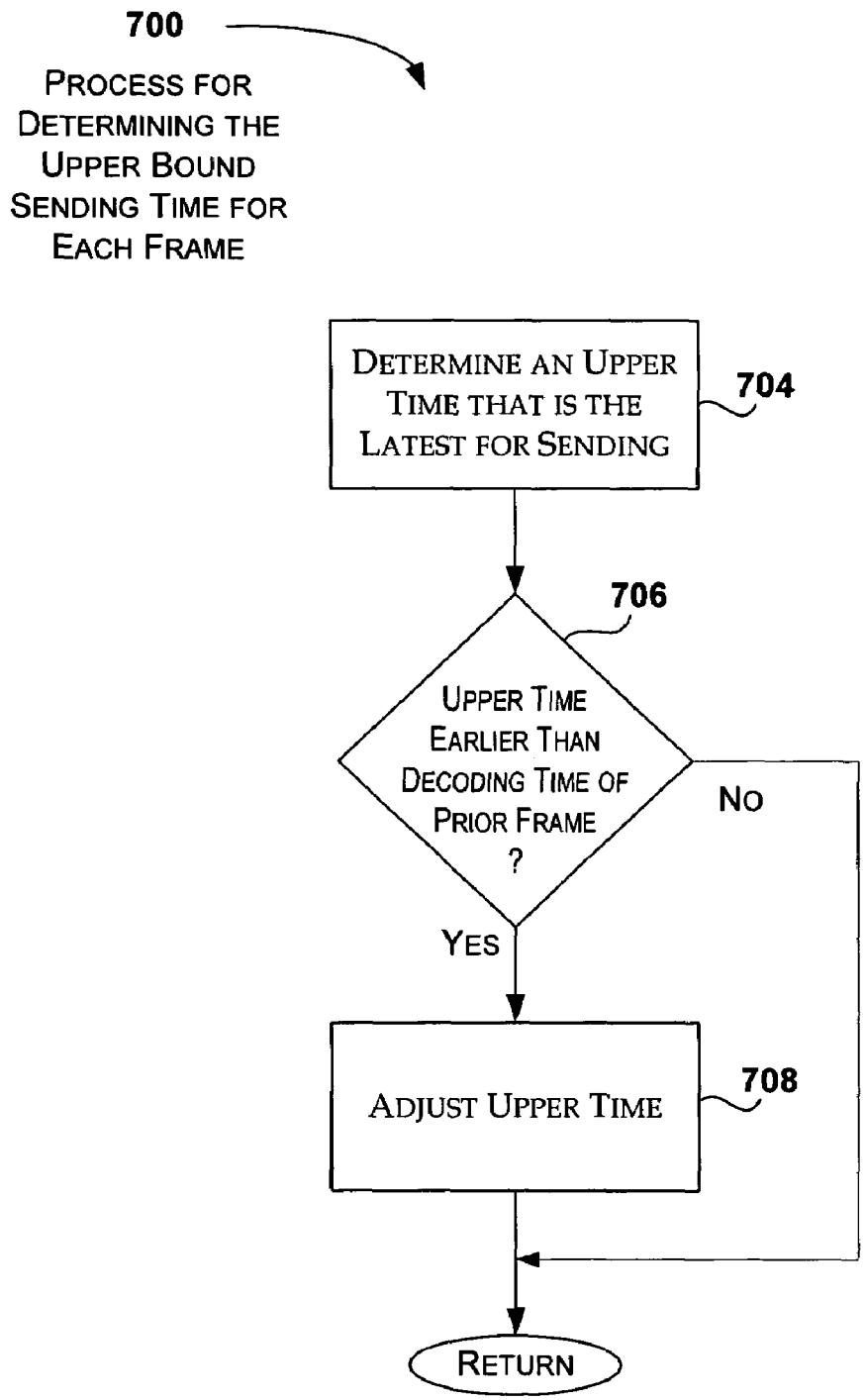
FIG. 7 is a flow diagram illustrating an exemplary process for determining the upper bound sending time for each frame that is suitable for use within the flow diagram illustrated in FIG. 5.

FIG. 7 is a flow diagram illustrating an exemplary process 700 for determining the upper bound sending time for each frame that is suitable for use within the flow diagram illustrated in FIG. 5. Processing begins at block 704.

At block 704, an upper time that is the latest time for sending the frame is determined. The upper time is the latest time after which the decoder buffer will underflow. The following equation determines the upper time:

$$DTS_i - L_i/R$$

Eq. 5

Thus, as shown, the upper time is the decoding time for the ith frame less the sending duration for the ith frame. Processing continues at decision block 706.

At block 706, a determination is made whether the upper time of the ith frame is earlier than the decoding time of the i−1th frame ($DTS_{i-1}$). If the upper time is earlier, processing continues at block 708. Otherwise, processing is complete.

At block 708, the upper time is adjusted. Basically, the upper time is adjusted to be the minimum time calculated between the decoding time of the i−1th frame or the upper bound of the previous frame. The following equation adjusts the upper time:

$$T_i^U = \begin{cases} DTS_N - \dfrac{L_N}{R} & \text{for } i = N \\ \min(DTS_i, T_{i+1}^U) - \dfrac{L_i}{R} & \text{for } 1 \le i < N. \end{cases}$$

Eq. 6

Thus, as shown above, when determining the upper bound sending time ($T_i^U$) for a frame i, the last frame N is calculated differently than other frames. For the last frame, the upper bound sending time is the decoding time of the Nth frame ($DTS_N$) minus the sending duration for the Nth frame ($L_N/R$). For any other frame, the upper bound is the minimum time calculated between the decoding time of the ith frame ($DTS_i$) or the upper bound of the previous frame (i+1). The sending duration for ith frame ($L_i/R$) is then subtracted from the minimum of the two times to obtain the upper bound. Once the upper bound is determined, process 700 is complete.

Figure 8:
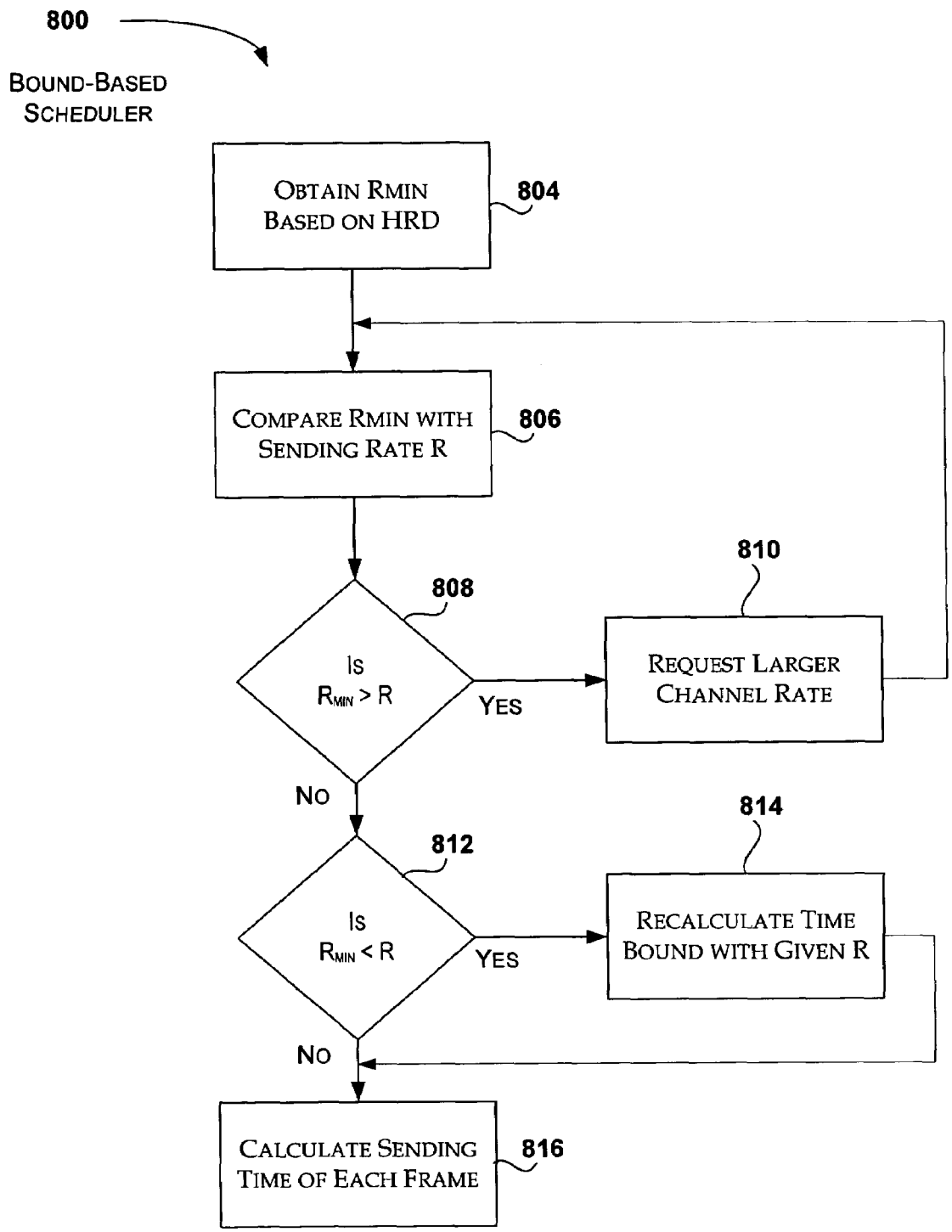
FIG. 8 is a flow diagram illustrating an exemplary bound-based scheduler operation illustrated in FIG. 4.

FIG. 8 is a flow diagram illustrating an exemplary process 800 for the Bound-based Scheduler illustrated in FIG. 2. A buffer size B and a channel switch delay are supplied or default values are used. Process 800 begins at block 804.

At block 804, the minimum rate ($R_{min}$) is obtained. The minimum rate ($R_{min}$) is calculated according to the bound-based HRD. Processing continues at block 806.

At block 806, a comparison is made between the minimum rate ($R_{min}$) and the assigned sending rate (R). Processing continues at decision block 808.

At decision block 808, a determination is made whether the minimum rate ($R_{min}$) is larger than the sending rate (R). If this is the case, the decoder may experience a buffer underflow or overflow condition. Thus, processing continues at block 810, where the scheduler asks for a larger channel rate. Processing that loops back to block 806 to begin comparing the new sending rate (R). If the minimum rate is not larger than the sending rate at decision block 808, processing continues at decision block 812.

At decision block 812, a determination is made whether the minimum rate is smaller than the sending rate. If this is the case, processing continues to block 814, where the time bounds are re-calculated using the sending rate (R). During this re-calculation process, Equations 2, 4, and 6 described above are used. Processing continues at block 816.

At block 816, the sending time for each frame is calculated based on the sending rate and the calculated upper and lower bounds. The sending time is calculated using the following equation:

$$S_i = \max[(S_{i-1} + L_{i-1}/R), (T_i^L + (T_i^U - T_i^L) \times \alpha)].$$

Eq. 7

As shown, the sending time for each frame is based on the maximum of two terms. The first term is the sending time for the previous frame ($S_{i-1}$) plus the sending duration for the previous frame ($L_{i-1}/R$). For the second term, the time is the lower bound of the ith frame plus the difference between the upper bound and lower bound of the ith frame multiplied by a scaling factor, where the scaling factor is from 0 to 1, inclusive. By choosing different values of α, various levels of robustness to buffer underflow and overflow can be achieved. For example, when α approaches zero, each frame is sent near its lower bound. Thus, the buffer will be closer to full. When α approaches one, each frame is sent near its upper bound and the buffer will be closer to empty. When α is midway, the buffer will maintain in the mid-range of fullness. The processing by the Bound-based Scheduler is then complete.

The Bound-based Scheduler generates output based on 1) the stream sample urgency factor; 2) the PSI urgency factor; 3) the PCR urgency factor; and the overall priority factor. In one embodiment for the stream sample urgency factor, the Bound-based Scheduler assumes a video stream is more urgent than an audio stream. Therefore, when both a video stream and an audio stream need to be output, the Bound-based Scheduler outputs the video stream before the audio stream. The stream sample urgency factor may be determined using the following equation:

$$F(t)=t-(St+Sd*(\text{Length}-SL)/\text{Length})-\text{delta},\qquad \text{Eq. 8}$$

where t is the current time, St is the sample's sending time, Sd is the sample's sending duration, Length is the sample's length, SL is the payload's length, and delta is a fixed constant. Then, if F(t) is less than 0, there is not an urgency for sending out a sample. However, if F(t) is greater than 0, there is an urgency for sending out a sample and a sample is output.

The PSI urgency factor is dependent on the Stream Urgency factor and may be determined using the following equation:

$$P(t)=\text{Last}Psi\text{Time}+PSI\text{Interval}-t-\text{delta},\qquad \text{Eq. 9}$$

where t is the current time, LastPsiTime is the last time a PSI packet was sent, delta is a fixed constant, and PSIInterval is based on the Stream Urgency factor. If all the current streams do not have anything to send (e.g., F(t)<0), the PSIInterval is the PSI Interval in the user's configuration divided by 2, else the PSIInterval is the PSI Interval in the user's configuration. Then, if P(t) is less than 0, the Bound-based scheduler stops sending stream samples and outputs PSI packets.

The PCR Urgency factor determines when PCR packets should be output using the following equation:

$$R(t)=\text{Last}PCR\text{Time}+PCR\text{Interval}-t-\text{delta},\qquad \text{Eq. 10}$$

where t is the current time, LastPCRTime is the last time a PCT packet was sent, delta is a fixed constant, and PCRInterval is the PCT interval specified in the user's configuration. Then, if R(t) is less than 0, the Bound-based scheduler stops sending stream samples and outputs a PCR packet.

In overview, in one embodiment, the overall sending priority from highest priority to lowest priority is 1) PSI packet; 2) PCR packet; 3) Stream samples; and 4) Null packet. The Bound-based scheduler may be configured to drop frames and/or report an error if it can not output samples on time.

While the buffering and scheduling mechanisms operate to avoid underflow and overflow condition, in addition to providing a channel switch with appropriate time delay, there are two decoding strategies that may be implemented in decoders. For one strategy, a decoding device starts to decode once the system time clock is the same as the picture's DTS stored in the packet. In another strategy, a decoding device starts to decode once the buffer reaches the initial buffer fullness. Therefore, the present method inserts the initial-buffer fullness information at every entry point header. The intital-buffer fullness is a field in the Entry point header syntax in VC-9 spec. The initial-buffer-fullness signals the buffer status (i.e., how many bits in the decoder buffer) when decoding the frame right after the entry point. Because the initial-buffer-fullness is set equivalent to the one when starting decoding according to DTS, the decoding behaviors of the above two decoding mechanisms are as close as possible if not the same.

In one embodiment, described in conjunction with equations 11-13 below, the initial-buffer fullness can be calculated for the online mode. In particular, when operating in the online mode, the packet length of the following packets may not be forecasted. Null data is padded to the original packet data to make it a constant bit rate stream. The padding length of the ith frame ($PL_i$) is calculated is follows:

$$PL_i = \begin{cases} (DTS_{i+1} - (S_i + T_{Delay}) - L_i/R)*R & \text{for } DTS_{i+1} - (S_i + T_{Delay}) - L_i/R > 0 \\ 0 & \text{else} \end{cases} \qquad \text{Eq. 11}$$

In above, the earliest sending time for the $i+1^{th}$ frame is $DTS_{i+1}-T_{Delay}$ in the online mode, and the actual sending time for the $i^{th}$ frame is $S_i$. Thus, the $i^{th}$ frame of L bits length will be sent within the interval $DTS_{i+1}-(S_i+T_{Delay})$. If this interval is too large such that there is some space left after sending the ith frame, i.e., $DTS_{i+1}-(S_i+T_{Delay})-L_i/R>0$, null data is padded to fill the remaining space in order to ensure the video is sent out at constant bit rate. Accordingly, the sending time equals:

$$S_i = \begin{cases} DTS_1 - T_{Delay} & \text{for } i = 1 \\ \text{Max}\left(S_{i-1} + \frac{L_{i-1}}{R} + \frac{PL_{i-1}}{R}, DTS_i - T_{Delay}\right) & \text{for } i > 1 \end{cases} \qquad \text{Eq. 12}$$

Finally, the initial-buffer-fullness is:

$$F_i=(DTS_i-S_i)\times R \qquad \text{Eq. 13}$$

The initial-buffer-fullness will be written back to the entry point header. Due to quantization, rounding error will be introduced and may be as large as B/256, where B is the decoder buffer size. This rounding error will cause extra delay to the decoder whose decoding strategy is based on the initial-buffer-fullness. In situations where frames following an entry point header are very small, the delay will be even longer due to the decoder waiting until more frames fill in the B/256 extra buffer introduced by the quantization error. This will increase the delay and the buffer could have high risk of overflow. Moreover, as the video elementary bitstream should be packetized into PES packets and multiplexed with the audio stream and the system information (e.g., PCR, PSI in MPEG-2 transport layer), the video bitstream may not always be sent out according to its scheduled sending time determined by the Buffer Controller. Consequently, even without the rounding error, the real initial-buffer-fullness can not match the calculated one.

However, in another embodiment, a more accurate initial-buffer fullness can be achieved by counting the byte number of data that would be received by the decoder from the time when the first byte of an entry pointer header is received until the DTS of the key frame following the entry pointer header. This count is then quantized (with a ceiling) with a stepsize equal to 1/256 of the decoder buffer size (B). This embodiment removes the influence of other elementary streams, such as PSI and audio. The rounding error is then controlled by performing the following steps back and forth: (1) if there is any video bit stream that needs to be sent at the current time, the bit stream is sent immediately until the rounding error is matched; (2) if there is no video bit stream that needs to be sent at the current time, padding bits are added to the previous frame (which has already been sent out) until either the rounding error is matched or the next frame's sending time is reached. This process insures that the extra delay caused by the rounding error will never be greater than $B/(256*R)$.

These and other variations of an initial buffer fullness method may be implemented in the converter 400 shown in FIG. 4. For example, the initial buffer fullness method may be included as part of the processing performed by the Bound-based Scheduler shown in block 414.

Figure 9:
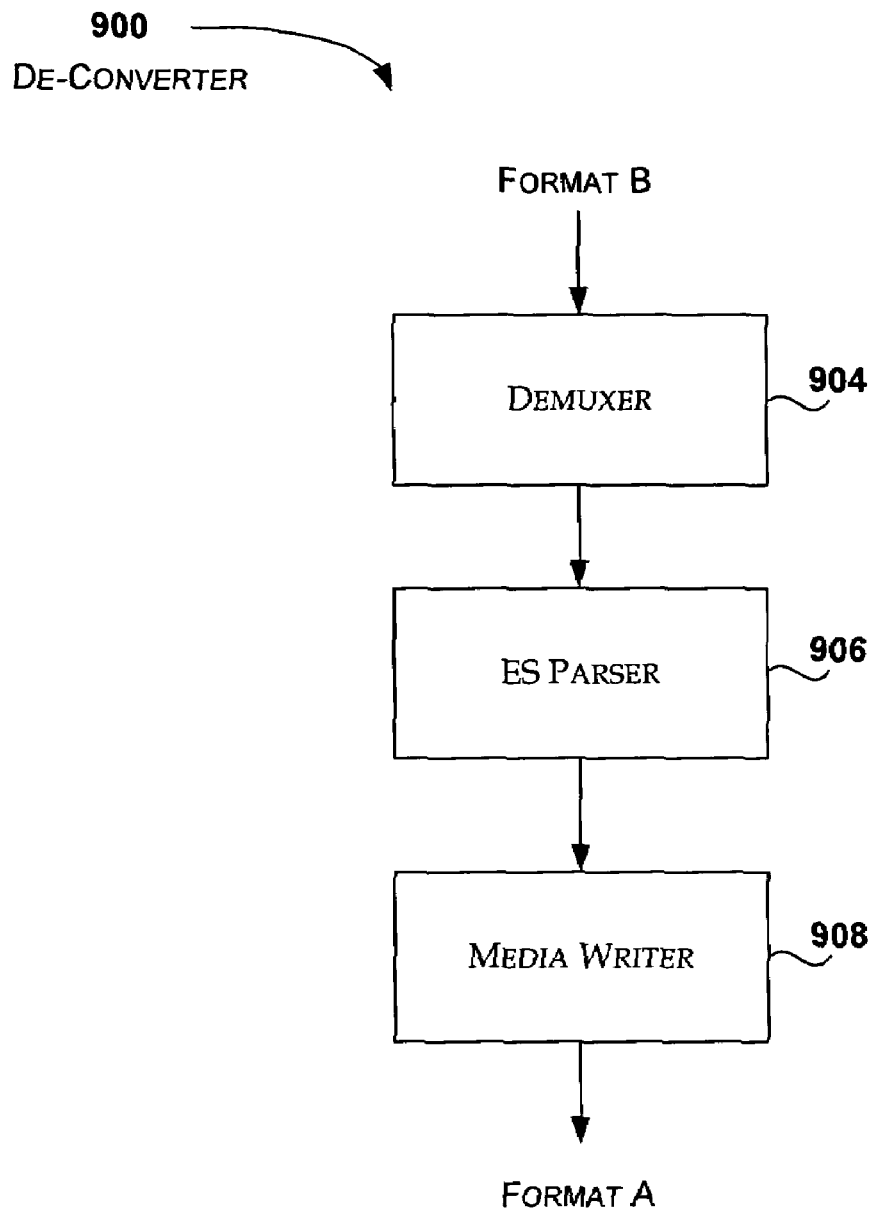
FIG. 9 is a block diagram illustrating an exemplary operation of the de-converter shown in FIG. 2.

FIG. 9 is a block diagram illustrating an overview of an exemplary operation of the de-converter 202 shown in FIG. 2. Process 900 is intrinsically uni-directional. Each block 904-908 operates as a filter and is connected in a pipeline manner. Each block accepts input from the block in front and passes its own output to a subsequent block.

Demuxer 904 is configured to accept a transport stream of a Format B and to parse the transport stream into several elementary streams. Demuxer 904 searches for PAT and for PMT. Once both the PAT and PMT are obtained, Demuxer 904 begins generating the elementary streams from the transport stream. This elementary stream, along with some additional information, is sent to ES Parser 906.

ES Parser 906 is configured to convert the elementary streams packets into stream samples. For a video elementary stream, ES Parser 906 uses start codes within the stream packets to convert the packets into samples. For an audio elementary stream, a length of the PES packets and an audio header is obtained before converting the packets into samples. In addition, ES Parser 906 may perform some pre-processing to the stream samples and sequence headers.

Media Writer 908 is configured to accept the program information and the stream samples. Using these items, the Media Writer 908 creates a file of the desired format (e.g., format A). Once the file is created in the desired format, an application associated with the file may be used to play the video/audio.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example embodiments and applications have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

What is claimed is:

1. At least one computer-readable storage medium having computer-executable instructions stored thereon for performing a method, comprising:
   determining a lower bound for sending a frame within an elementary stream, the lower bound corresponding to an earliest time for sending the frame that will not result in an overflow condition within a decoder buffer, the determining the lower bound including scanning the elementary stream from a first frame to a last frame thereof;
   determining an upper bound for sending the frame, the upper bound corresponding to a latest time for sending the frame that will not result in an underflow condition within the decoder buffer, the determining the upper bound including scanning the elementary stream from the last frame to the first frame thereof; and
   scheduling a send time based on the lower bound and the upper bound, the send time being when a packet associated with the frame is transmitted over a channel in a broadcast environment.

2. The computer-readable storage medium of claim 1, wherein the lower bound is adjusted based on a channel delay associated with switching from the channel to another channel.

3. The computer-readable storage medium of claim 1, wherein the lower bound is adjusted so that the lower bound is less than or equal to the lower bound of a previous frame plus a sending duration of the previous frame.

4. The computer-readable storage medium of claim 1, wherein the upper bound is adjusted based on a sending duration of the frame subtracted from a minimum time calculated between the decoding timestamp of the frame and the upper bound of a next frame.

5. The computer-readable storage medium of claim 1, further comprising determining an initial buffer fullness value for use by a decoder that starts to decode once the decoder buffer reaches the initial buffer fullness value.

6. The computer-readable storage medium of claim 5, wherein the initial buffer fullness value is inserted into an entry point header.

7. The computer-readable storage medium of claim 1, wherein a parameter for a hypothetical decoder is based on the upper bound and the lower bound.

8. The computer-readable storage medium of claim 1, further comprising accepting a file of a first format, extracting the elementary stream from the file, and determining the lower bound and the upper bound for each frame within the elementary stream.

9. The computer-readable storage medium of claim 1, wherein the packet comprises a MPEG based transport packet.

10. A system embodied within a computer-readable storage medium for transmitting elementary streams in a broadcast environment, the method system comprising:
    a buffer controller configured to calculate a lower bound and an upper bound for each frame in an elementary stream, the lower bound being determined on a first pass in which the elementary stream is scanned from a first frame to a last frame, the upper bound being determined on a second pass in which the elementary stream is scanned from the last frame to the first frame; and a packet scheduler configured to choose a proper sending time for each frame based on the lower bound and the upper bound calculated for the frame.

11. The system embodied within a computer-readable storage medium of claim 10, further comprising a sample pre-parser configured to extract a plurality of samples from an input by removing at least one header from the input, each sample being associated with one of the frames.

12. The system embodied within a computer-readable storage medium of claim 11, wherein the header comprises a sequence header.

13. The system embodied within a computer-readable storage medium of claim 11, wherein the header comprises an entry point header.

14. The system embodied within a computer-readable storage medium of claim 10, wherein the removed header remains associated with the sample.

15. The system embodied within a computer-readable storage medium of claim 11, wherein the sample pre-parser includes a by-pass mode which when selected passes the input onto the buffer controller without extracting the samples.

16. The system embodied within a computer-readable storage medium of claim 10, further comprising a stream enhancer configured to insert sequence level information with the samples.

17. The system embodied within a computer-readable storage medium of claim 16, wherein the stream enhancer utilizes information from a removed header associated with the sample for determining the sequence level information for the sample.

18. The system embodied within a computer-readable storage medium of claim 10, further comprising a PES packetizer configured to convert the samples into PES packets.

19. The system embodied within a computer-readable storage medium of claim 18, wherein the PES packetizer converts the samples into PES packets by adding PES headers before the samples.

20. The system embodied within a computer-readable storage medium of claim 19, wherein the packet scheduler converts the PES packets in an output format.

21. The system embodied within a computer-readable storage medium of claim 20, wherein the output format comprises a MPEG based format.

22. A system comprising:

a processor; and a memory into which a plurality of instructions are loaded, the plurality of instructions performing a method comprising:

determining a lower bound for sending a frame within an elementary stream, the lower bound corresponding to an earliest time for sending the frame that will not result in an overflow condition within a decoder buffer, the earliest time being based on at least a number of bits associated with one or more frames prior to the frame and a number of bits associated with the frame;

determining an upper bound for sending the frame, the upper bound corresponding to a latest time for sending the frame that will not result in an underflow condition within the decoder buffer, the latest time being at least a decoding time of the frame less a sending duration for the frame; and scheduling a send time based on the lower bound and the upper bound, the send time being when a packet associated with the frame is transmitted over a channel in a broadcast environment.

23. The system of claim 22, wherein the lower bound is adjusted based on a channel delay associated with switching from the channel to another channel.

24. The system of claim 22, wherein the lower bound is adjusted so that the lower bound is less than or equal to the lower bound of a previous frame plus a sending duration of the previous frame.

25. The system of claim 22, wherein the upper bound is adjusted based on a sending duration of the frame subtracted from a minimum time calculated between a decoding timestamp of the frame and the upper bound of a next frame.

26. The system of claim 22, further comprising determining an initial buffer fullness value for use by a decoder that starts to decode once the decoder buffer reaches the initial buffer fullness value.

27. The system of claim 26, wherein the initial buffer fullness value is inserted into an entry point header.

28. The system of claim 22, wherein a parameter for a hypothetical decoder is based on the upper bound and the lower bound.

29. The system of claim 22, further comprising accepting a file of a first format, extracting the elementary stream from the file, and determining the lower bound and the upper bound for each frame within the elementary stream.

30. The system of claim 22, wherein the packet comprises a MPEG based transport packet.

* * * * *

UNITED STATES PATENT AND TRADEMARK OFFICE
CERTIFICATE OF CORRECTION

PATENT NO. : 7,433,946 B2  Page 1 of 1
APPLICATION NO. : 10/917243
DATED : October 7, 2008
INVENTOR(S) : Guobin Shen et al.

It is certified that error appears in the above-identified patent and that said Letters Patent is hereby corrected as shown below:

In column 16, line 62, in Claim 10, after "the" delete "method".

Signed and Sealed this
Twenty-sixth Day of April, 2011

David J. Kappos
*Director of the United States Patent and Trademark Office*